United States Patent [19]

Rigby

[11] Patent Number: 4,512,862

[45] Date of Patent: Apr. 23, 1985

[54] METHOD OF MAKING A THIN FILM INSULATOR

[75] Inventor: Eugene B. Rigby, Tucson, Ariz.

[73] Assignee: International Business Machines Corporation, Armonk, N.Y.

[21] Appl. No.: 520,963

[22] Filed: Aug. 8, 1983

[51] Int. Cl.³ .............................................. B05D 5/12'
[52] U.S. Cl. ............................ 204/192 D; 427/126.4; 427/127; 427/372.2; 427/397.7; 427/397.8; 427/419.3; 427/419.4; 427/443.2
[58] Field of Search .......... 204/181 T, 192 C, 192 D; 427/126.2, 126.4, 127, 372.2, 397.7, 397.8, 419.3, 419.4, 443.2

[56] References Cited

U.S. PATENT DOCUMENTS

| 3,206,329 | 9/1965 | Hickle | 427/126.4 X |
| 3,318,731 | 5/1967 | Blum | 427/126.4 X |
| 3,656,229 | 4/1972 | Sakurai et al. | 427/126.4 X |
| 3,730,766 | 5/1973 | Nishimatsu et al. | 427/419.3 X |

OTHER PUBLICATIONS

R. K. Iler, "Multilayers of Colloidal Particles", Journal of Colloid and Interface Science 21, pp. 569–594, Jun. 1966.

Primary Examiner—G. L. Kaplan
Assistant Examiner—W. T. Leader
Attorney, Agent, or Firm—John H. Holcombe

[57] ABSTRACT

In magnetic heads it is often necessary to place conductive films on a ferrite substrate. If the ferrite is conductive, an insulative film is required between the ferrite substrate and the conductive film. A thin insulative film can be formed on a surface of the ferrite substrate by alternately dipping the substrate in solutions containing particles of silica and alumina.

6 Claims, 1 Drawing Figure

METHOD OF MAKING A THIN FILM INSULATOR

FIELD OF THE INVENTION

In the manufacture of thin film heads for magnetic tape and magnetic disk devices, it has been found desirable to form the heads from ferrite material such as manganese zinc (MnZn) ferrite. However, since this ferrite material is conductive, it is essential that it be separated from any conductive material deposited on the ferrite substrate for proper head operation. Attempts have been made to vapor-deposit thin, amorphous alumina films on the ferrite substrate; however, problems exist with this vapor-deposition process. The amorphous film is not resistant to subsequent etching and is also not very wear-resistant, so the lifetime of the head is quite short. Furthermore, with the very thin films required, the amorphous film tends to have pinholes when it is deposited in thicknesses less than 5000 Å. This allows electrical conduction through the pinholes. Consequently, the amorphous films do not have the requisite insulative properties. The present inventor has discovered a process for providing an insulating film on the ferrite heads which has the requisite insulating properties and is wear- and etch-resistant. The film is also very uniform in thickness and can be less than 5000 Å thick. This is accomplished by providing alternate single particle layers or monolayers of spherical particles of $SiO_2$ and $Al_2O_3$ on the substrate and subsequently treating the substrate to seal the coated surface.

DESCRIPTION OF THE PRIOR ART

The formation of inorganic films as insulating layers on a surface is well known. For example, in S. Ruben, U.S. Pat. No. 1,829,237, an $Al_2O_3$ coating forms a crystalline layer on a heater element. In accordance with Ruben, the heater or resistance wire is coated with a layer of finely coated aluminum oxide that has been previously calcined and mixed with a small percentage of sodium silicate. The material is then dried on the wire and heated in a reducing atmosphere to form a crystalline layer of corundum. According to Ruben, a complete reaction between the sodium silicate and the aluminum oxide is important to obtain proper crystalline form and surface adhesion. The Ruben patent describes a coating process which would not provide the uniform film required of current thin-film magnetic heads. In particular, the deposition of a finely powdered material on the substrate is not readily controllable as to the thickness of the deposited coating.

U.S. Pat. No. 3,206,329 to Hickle describes a process wherein a $Al_2O_3.SiO_2$ mixture is formed as a slurry in which the metal base to be coated is dipped. The coated base is then subsequently heated to form the insulating coating on the substrate. This process again does not provide the closely controlled uniform thickness provided by the present inventor, particularly of films less than one micron in thickness.

U.S. Pat. No. 3,318,731 to Blum does describe a process for forming a coating of a thickness between 2-4 microns on a ferrous magnetic sheet. In the patent, the finely particulated refractory particles are applied in the form of a slurry, or suspension, in water or in suitable volatile solvents which evaporate during the subsequent heat-treating operation to leave a residuary deposit of refractory particles. This patent again does not provide the uniform coating of a very thin coating in the range of 1.0 micron or less, as provided by the present inventor's process.

The above references are directed to processes that provide coatings of thickness in excess of 2 microns. Furthermore, the coatings are not of uniform thickness.

Japanese patent application 55-3809 describes a process for chemically vapor-depositing alumina on a silicon dioxide layer formed on a silicon substrate. As indicated earlier herein, the so-formed alumina layer does not have the etch or wear resistance required for a thin-film magnetic head. This Japanese patent application may provide a thin coating, but it cannot selectively or uniformly deposit on a surface because the vapor-deposition methods cannot coat the sides of any depressions or holes in the surface. The present inventor has devised a process which will uniformly deposit on the entire surface, including depressions, holes or the like.

SUMMARY OF THE INVENTION

The present inventor has discovered a process for forming a thin insulating film on a ferrite substrate which is both wear and etchant resistant. The process consists of the steps of polishing and cleaning the surface of the ferrite substrate, alternately dipping the ferrite substrate in a silica solution containing colloidal-size spherical particles of silicon dioxide and an alumina solution containing colloidal-size particles of $Al_2O_3$ to form alternate monolayers of silica and alumina on the substrate, and then treating the substrate by either heat treatment or by suspending the coated substrate in a hydrolized orthosilicate solution or a sodium silicate solution to form an impervious crystalline layer.

The foregoing and other objects, features, and advantages of the invention will be apparent from the following more particular description of preferred embodiments of the invention, as illustrated in the accompanying drawing.

BRIEF DESCRIPTION OF DRAWING

The invention will be better understood with reference to the attached FIGURE which shows the substrate with the subsequent monolayer films shown in an enlarged configuration.

DESCRIPTION OF THE PREFERRED EMOBIDMENTS

Figure 1:
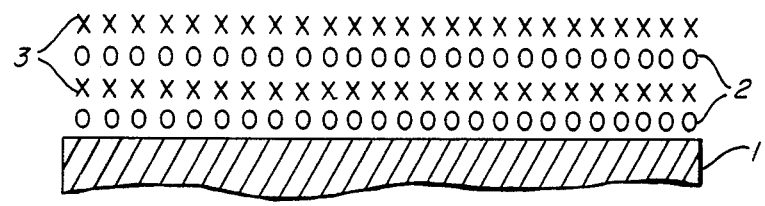

The preferred processing of a ferrite substrate will now be described.

The ferrite substrate 1 is polished and cleaned. This may be done by normal ceramic lapping techniques using a 1 micron diamond paste. After lapping, the substrate may be cleaned by placing it in a methylene chloride solution for about one hour, cleaning in a glass detergent while using an ultrasonic cleaner to agitate it about five minutes, immersing it in propanol for approximately three minutes, and then cleaning it with acetone.

A 2 wt % silica solution is prepared which contains spherical particles of $SiO_2$. The particles should be of colloidal size and usually within the range of 50 Å to 400 Å. The present inventor has found that particles of 150 Å size are preferable. The pH of the solution is adjusted to 4±0.5 with acetic acid. Such a solution is commercially available from the Du Pont Co. under the trade name "A M Ludox". This solution is a 30 wt % basic solution of 150 Å-sized silica spheres. To obtain a 2 wt % silica solution, the commercially available solution is diluted and acetic acid added to it to adjust the pH of the solution to 4±0.5. It should be recognized that other levels of pH and wt % will also provide satisfactory results; however, the present inventor has obtained best results with the levels and ranges indicated. A pH range of 2-5 and wt % of up to 5% may provide satisfactory results. Furthermore, other acids, such as hydrochloric acid, could be used to adjust the pH level.

A solution of alumina particles is also prepared. Alumina particles can be obtained in a powder form as alpha alumina monohydrate, which is commonly known as boehmite. Alumina particles of 50 Å size is preferred. The alumina particles are dispersed in a solution which is adjusted to a pH in the range between 2-5. The preferred pH is between 3-5. The pH may be adjusted with acetic or hydrochloric acid. The alumina is preferably dispersed in the solution at 1 wt %.

The zeta potential for this silica solution is negative in the pH range of 4, whereas the zeta potential of the alumina solution is positive in this range. Therefore, since the particles in the two solutions are oppositely charged, it is possible to alternately coat the substrate with a first monolayer 2 of silica and then a subsequent monolayer 3 of alumina. This process may be continued until the coating thickness desired on the substrate is reached.

The ferrite substrate 1 is polished and cleaned. The ferrite assumes a characteristic positive electrical surface charge in the presence of a water medium at a pH of approximately 4. This positively-charged substrate 1 is then dipped into the negatively-charged silica solution, is then washed in deionized water followed by drying, and then dipped in the solution containing positively-charged alumina particles to form alternate layers 2 and 3 of silica and alumina respectively, as shown in FIG. 1. Each of the layers 2 and 3 is approximately one particle in thickness (monolayer). Consequently, the actual thickness of the insulating layer can be accurately controlled by simply controlling the number of times the substrate is dipped in the colloidal solutions. The deposited layers are then sealed. This sealing is necessary since the deposited layers can easily be removed because they are held together only by electrostatic forces. The layers are sealed together and to the substrate.

There are a number of ways in which the monolayers of silica and alumina can be sealed. In the case where the ferrite substrate can be exposed to temperatures in the order of 600°-800° C., the substrate can be heated wherein the colloidal particles react together to form an impervious layer of spinel ($Al_2O_3.SiO_2$) and $Al_2O_3$ or $SiO_2$. This layer is normally crystalline in structure. In many cases, the ferrite cannot be exposed to such a high temperature because of undesired interaction between the ferrite and the colloidal surface or the gaseous environment. In this situation, the surface can be treated by dipping the substrate into a sealing solution.

One solution is a hydrolized orthosilicate solution, which is well known in the silicate literature (R. K. Iler's book THE CHEMISTRY OF SILICA published 1979 by John Wiley & Sons, see pg. 179). This solution is made by the addition of isopropyl alcohol and water to a commercially-available tetraethylorthosilicate, which is catalyzed by a few drops of hydrochloric acid to a hydrolized condition. The silica concentration is approximately 0.2% (0.2% to 0.6% is acceptable). The hydrolized solution so formed is then made basic by the addition of either ammonium hydroxide ($NH_4OH$) or sodium hydroxide (NaOH) to a pH between 11.5-12.5. The coated ferrite is then immediately placed in this basic hydrolized orthosilicate solution. The ferrite is suspended in the solution between 1-2 hours, during which time the solution is stirred. After the ferrite is removed from the solution, it is washed in a deionized water solution and the samples dried in an air oven at about 135° C. for 2-24 hours. The coated ferrite is then subjected to a final heat treatment between 250°-350° C., for a period between 8-30 hours in air, to complete the sealing and removal of residual water. It is believed that the use of the hydrolized orthosilicate solution in this manner promotes the formation of monosilicic acid ($SiO_4$) in the solution, which polymerizes upon the high surface area particles on the substrate to form an amorphous silica layer around the particles. The sealing solution impregnates the layers of colloid particles and, in effect, substantially surrounds them and bonds them together and to the substrate so that they are firmly held to the ferrite substrate. After the ferrite has been held in the solution for a sufficient period of time, the colloid particles become sealed together by the polymerization of the monosilicic acid. The low-temperature heat treatment of the substrate, after dipping in the hydrolized orthosilicate solution, drives off any residual water molecules which may be present.

An alternative process for treating the coated surface of the ferrite is to suspend the coated ferrite material in a stirred and heated sodium silicate solution. A 1% silica solution can be used to produce an adequate sealant for the colloids. The pH of the solution should be between 10 and 10.5. The coated ferrite material is suspended in the stirred and heated solution for 1-2 hours. The solution is maintained at a temperature of between 90°-98° C. After the ferrite is removed from the solution, it is washed and oven dried at 100°-150° C. between 2-16 hours. The samples of ferrite are then heated in air to 300° C. for at least 16 hours. In this process monosilicic acid is also formed which polymerizes into amorphous silica, which surrounds and seals the deposited colloidal particles on the ferrite substrate.

Finally, in the manufacture of ferrite heads, it is often required that a deposited metal film be formed on the ferrite. To avoid any reaction between the overcoat on the ferrite and the deposited metal film, a sputtered layer of alumina may be applied over the sealed colloid. The sputtered alumina layer also contributes to the sealing of the underlying colloid insulation layer.

By this method, the inventor has provided a process for forming a thin, accurately-defined insulating film on a ferrite substrate which is both wear and etchant resistant. The method also provides a very flat or uniform surface on the substrate.

While the invention has been particularly shown and described with reference to preferred embodiments thereof, it will be understood by those skilled in the art that various changes in form and details may be made therein without departing from the spirit and scope of the invention.

What is claimed is:

1. A process for forming a thin insulative coating on a substrate having an electrical surface charge in an acidic solution comprising the steps of:

preparing an up to 5% by weight silica solution containing particles of $SiO_2$ in the range between 50 Å and 400 Å, said solution having a pH in the range between 2 and 5 and a first charge;

preparing an approximately 1% by weight alumina solution containing alumina particles of approximately 50 Å size, said alumina solution having a pH in the range between 2 and 5 and a second charge opposite to said first charge;

dipping said substrate into the one of said solutions having a charge opposite to said surface charge and, thereafter, alternately dipping said substrate into said prepared solutions to form at least one layer of particles from each charged solution to thereby form alternate silica and alumina layers on said substrate, said alternating layers being formed until a coating thickness of at least 1000 Å is obtained; and sealing the coated surface of said dipped substrate by (a) heating said substrate, or (b) dipping said substrate in a hydrolized orthosilicate solution, washing said dipped substrate and subsequently heating said substrate to a temperature between 250° to 350° C., or (c) dipping said substrate in a heated sodium silicate solution, washing said dipped substrate and subsequently heating said substrate.

2. A process for forming a thin insulative coating on a conductive ferrite substrate having an electrical surface charge in an acidic solution comprising the steps of:

preparing an up to 2% by weight silica solution containing spherical particles of $SiO_2$ of between about 150 Å and 400 Å, said solution having a pH in the range between 3.5 and 4.5 and a first charge;

preparing an approximately 1% by weight alumina solution containing alumina particles of approximately 50 Å size, said alumina solution having a pH in the range between 3 and 5 and a second charge opposite to said first charge;

dipping said substrate into the one of said solutions having a charge opposite to said surface charge and, thereafter, alternately dipping said substrate into said prepared solutions to form at least one layer of particles from each charged solution to thereby form alternate silica and alumina layers on said substrate, said alternating layers being formed until a coating thickness of at least 1000 Å is obtained; and sealing the coated surface of said dipped substrate by (a) heating said substrate, or (b) dipping said substrate in a hydrolized orthosilicate solution, washing said dipped substrate and subsequently heating said substrate to a temperature between 250° to 350° C., or (c) dipping said substrate in a heated sodium silicate solution, washing said dipped substrate and subsequently heating said substrate.

3. A process as defined in claim 1 wherein said substrate is a conductive ferrite.

4. A process as defined in claim 2 wherein said ferrite is manganese-zinc ferrite.

5. A process as defined in claim 1, 2, 3 or 4 wherein said substrate has a positive electrical surface charge and said silica solution has a negative charge.

6. A process as defined in claim 1, 2, 3 or 4 further comprising the step of sputtering an alumina layer over said sealed surface of said substrate.

* * * * *